US012803907B2

(12) United States Patent
Manassakis et al.

(10) Patent No.: US 12,803,907 B2
(45) Date of Patent: Nov. 17, 2026

(54) BORDER GATEWAY PROTOCOL MESSAGE MONITORING SYSTEM

(71) Applicant: Cisco Technology, Inc., San Jose, CA (US)

(72) Inventors: Eleftherios Manassakis, Crete (GR); Vasileios Kotronis, Athens (GR); Ioannis Sermetziadis, Heraklion of Crete (GR); Ioannis E. Paterakis, Heraklion Crete (GR); Konstantinos Arakadakis, Heraklion Crete (GR); Georgios Eptaminitakis, Crete (GR)

(73) Assignee: CISCO TECHNOLOGY, INC., San Jose, CA (US)

( * ) Notice: Subject to any disclaimer, the term of this patent is extended or adjusted under 35 U.S.C. 154(b) by 72 days.

(21) Appl. No.: 18/919,786

(22) Filed: Oct. 18, 2024

(65) Prior Publication Data

US 2026/0106825 A1 Apr. 16, 2026

(30) Foreign Application Priority Data

Oct. 11, 2024 (EP) .................................... 24300008

(51) Int. Cl.
*H04L 45/00* (2022.01)
*H04L 45/02* (2022.01)
*H04L 45/748* (2022.01)

(52) U.S. Cl.
CPC .............. *H04L 45/70* (2013.01); *H04L 45/04* (2013.01); *H04L 45/748* (2013.01)

(58) Field of Classification Search
None
See application file for complete search history.

(56) References Cited

U.S. PATENT DOCUMENTS 9,729,414 B1 8/2017 Oliveira et al.
10,594,592 B1 * 3/2020 Wang .................... H04L 45/033
(Continued)

FOREIGN PATENT DOCUMENTS

CN 114124811 A 3/2022
EP 3051758 B1 3/2021

OTHER PUBLICATIONS

Amin C., "RIS Live BGP Message Stream," Ripe Labs, Feb. 15, 2019, Retrieved from https://labs.ripe.net/author/chris_amin/ris-live-bgp-message-stream/ on Aug. 14, 2024, pp. 1-5.
(Continued)

*Primary Examiner* — Joshua Joo
(74) *Attorney, Agent, or Firm* — Edell, Shapiro & Finnan, LLC

(57) ABSTRACT

A method, computer system, and computer program product are provided for a Border Gateway Protocol (BGP) message monitoring system. At a route collector, border gateway protocol (BGP) data is obtained from a plurality of peers by a plurality of routers, wherein the BGP data indicates a plurality of routes in a network associated with application network traffic, and wherein the route collector obtains the BGP data via a first BGP session and the BGP data is labeled with respect to a source of each route. The BGP data is provided from the route collector to a BGP Monitoring Protocol (BMP)-enabled BGP router via a second BGP session, wherein the BGP data is aggregated in a database that is configured to provide a state of one or more requested routes to a requesting entity.

20 Claims, 5 Drawing Sheets

(56) References Cited

U.S. PATENT DOCUMENTS

| | | | | |
|---|---|---|---|---|
| 11,552,876 | B1 | 1/2023 | Zhang et al. | |
| 12,015,587 | B2 * | 6/2024 | Ye | H04L 45/00 |
| 2005/0198269 | A1 | 9/2005 | Champagne et al. | |
| 2006/0233181 | A1 * | 10/2006 | Raszuk | H04L 45/54 370/401 |
| 2007/0058568 | A1 * | 3/2007 | Previdi | H04L 45/02 370/254 |
| 2007/0104106 | A1 * | 5/2007 | Patel | H04L 45/04 370/254 |
| 2008/0151755 | A1 * | 6/2008 | Nishioka | H04L 45/02 370/235 |
| 2011/0093612 | A1 | 4/2011 | Murakami | |
| 2012/0099440 | A1 * | 4/2012 | Dong | H04L 45/033 370/242 |
| 2014/0351452 | A1 * | 11/2014 | Bosch | H04L 45/0377 709/242 |
| 2016/0014025 | A1 * | 1/2016 | Wang | G06F 9/45558 370/392 |
| 2018/0254972 | A1 * | 9/2018 | Patel | H04L 45/04 |
| 2021/0135982 | A1 | 5/2021 | Chaturmohta et al. | |
| 2021/0160163 | A1 | 5/2021 | Gray | |
| 2022/0263746 | A1 * | 8/2022 | Wang | H04L 45/02 |
| 2023/0269174 | A1 * | 8/2023 | Liu | H04L 45/26 370/254 |
| 2024/0414079 | A1 * | 12/2024 | Zhuang | H04L 45/04 |
| 2025/0150486 | A1 * | 5/2025 | Hoxworth | H04L 63/1458 |

OTHER PUBLICATIONS

BGP.CHEAP: "BGP.cheap," Retrieved from https://bgp.cheap on Aug. 14, 2024, pp. 1-15.

BGPSTREAM: "What's New in BGPStream V2," Retrieved from https://bgpstream.caida.org/v2-whats-new on Aug. 14, 2024, pp. 1-6.

BIRD: "BIRD BGP Filter Example," Posted on Jun. 15, 2015, Retrieved https://saidvandeklundert.net/2015-06-15-bird-basic-filter/ on Aug. 14, 2024, pp. 1-4.

CISCO: "Cisco Crosswork Cloud Network Insights," Data Sheet, Cisco Public, Last updated on Jun. 4, 2024, Retrieved from https://www.cisco.com/c/en/us/products/collateral/cloud-systems-management/crosswork-network-automation/datasheet-c78-740228.html, pp. 1-16.

Filip O., et al., "Filters," BIRD User's Guide (version 1.6.8), Retrieved from https://bird.network.cz/doc/bird-5.html on Aug. 14, 2024, pp. 1-8.

Manassakis L., "ThousandEyes BGP Monitors, " ThousandEyes Engineering, Medium, Apr. 30, 2024, Retrieved from https://medium.com/thousandeyes-engineering/thousandeyes-bgp-monitors-fac4d272609c on May 14, 2024, pp. 1-13.

RIPE NCC: "Routing Information Service Live (RIS Live)," Retrieved from https://ris-live.ripe.net on Aug. 14, 2024, pp. 1-5.

Walton D., et al., "Advertisement of Multiple Paths in BGP," Internet Engineering Task Force (IETF), Request for Comments: 7911, Category: Standards Track, Jul. 2016, pp. 1-8.

Yan H., et al., "BGPMon and NetViews: Real-time BGP Monitoring System," https://infocom2009.ieee-infocom.org/demos/5%20-%20BGP%20Mon.pdf, Jan. 2009, 3 Pages.

BGP.Services, "BGP Services," retrieved from https://bgp.services/, on Oct. 18, 2024, 14 pages.

GITHUB—OSRG/GOBGP, "BGP implemented in the Go Programming Language," retrieved from osrg.github.io/gobgp/, on Oct. 18, 2024, 4 pages.

Bates, et al., "BGP Route Reflection: An Alternative to Full Mesh Internal BGP (IBGP)," Network Working Group, Request for Comments: 4456, https://datatracker.ietf.org/doc/html/rfc4456, Apr. 2006, 12 pages.

Office Action for European Application No. 25205126.3, dated Feb. 16, 2026, 9 Pages.

Scudder J., et al., "BGP Monitoring Protocol ", draft-ietf£-grow-bmp-09, Internet Engineering Task Force, Standard working draft, Internet Society (ISOC) 4, Rue Des Falaises CH- 1205 H04L Geneva, Switzerland, XP015107175, Section 9, Using BMP, Jul. 4, 2015, 25 pages.

BIRD: "The BIRD Internet Routing Daemon Project", retreived from https://bird.network.cz/get_doc&v=20&f=bird-6.html#ss6.4 on Oct. 18, 2024, 41 pages.

* cited by examiner

BORDER GATEWAY PROTOCOL MESSAGE MONITORING SYSTEM

TECHNICAL FIELD

The present disclosure relates generally to a system for monitoring border gateway protocol (BGP) messages.

BACKGROUND

The Border Gateway Protocol (BGP) is used to exchange routing information between different autonomous systems (ASes) on the Internet, enabling efficient and reliable inter-domain routing. BGP messages provide valuable data for network monitoring tools to analyze routing performance, detect routing issues, and optimize network operations. Thus, it is important to observe and analyze BGP updates in order to have a current understanding of network activity. However, platforms that provide an updated feed of BGP messages rely on public BGP data sources, meaning that such platforms are susceptible to these data sources becoming unavailable or otherwise ceasing to function.

DETAILED DESCRIPTION

Overview

Figure 1:
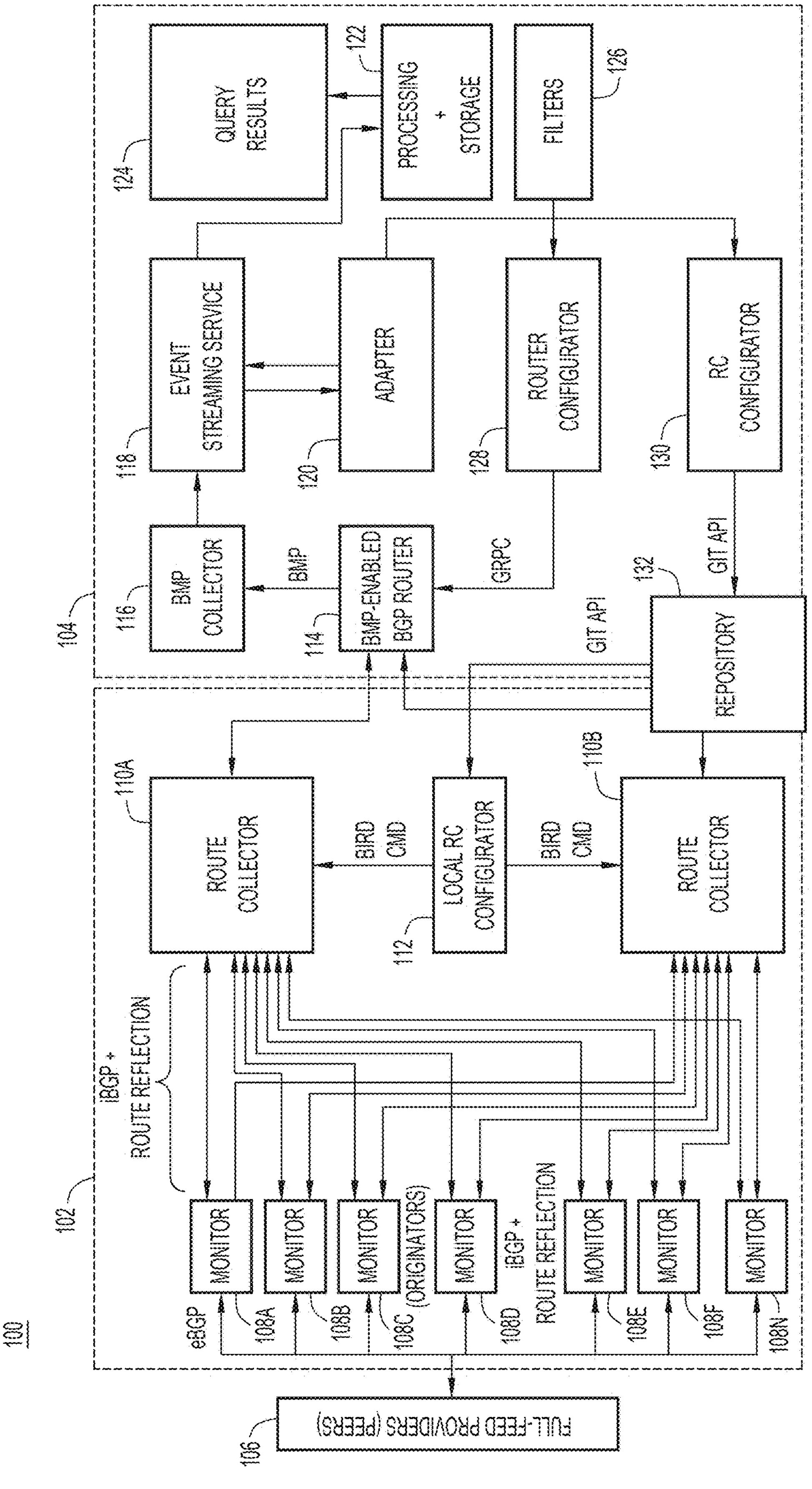
FIG. 1 is a block diagram depicting an environment for BGP message monitoring, according to an example embodiment.

According to one embodiment, techniques are provided for a BGP message monitoring system. At a route collector, border gateway protocol (BGP) data is obtained from a plurality of peers by a plurality of routers, wherein the BGP data indicates a plurality of routes in a network associated with application network traffic, and wherein the route collector obtains the BGP data via a first BGP session and the BGP data is labeled with respect to a source of each route. The BGP data is provided from the route collector to a BGP Monitoring Protocol (BMP)-enabled BGP router via a second BGP session, wherein the BGP data is aggregated in a database that is configured to provide a state of one or more requested routes to a requesting entity.

EXAMPLE EMBODIMENTS

The Border Gateway Protocol (BGP) is a protocol that manages how packets are routed across the Internet by exchanging routing information between different autonomous systems (ASes). A route is a network path to a destination, including the ASes through which traffic is routed. An AS is a particular network that is under a common administration and therefore has common routing policies.

BGP enables data to be routed across multiple networks to reach its destination. BGP routers communicate with each other to exchange information about the reachability of Internet Protocol (IP) prefixes, which represent blocks of IP addresses.

BGP message streaming platforms are services that collect and provide routing information regarding various locations across the Internet. These platforms maintain routing information in an up-to-date manner so that informed decisions can be made as to how network traffic should be routed. However, conventional BGP message streaming platforms rely on public BGP data sources, which can be unreliable.

Generally, the embodiments presented herein provide an independent BGP monitoring infrastructure that offers improvements in terms of availability, quality/integrity, and security/visibility. Relying exclusively on third-party sources for data presents as risk, as these infrastructures may experience outages or periods of unavailability. In contrast, the embodiments presented herein provide an independent infrastructure for BGP monitoring. The embodiments presented herein more accurately maintain routing state information. Moreover, by maintaining an independent infrastructure in accordance with the embodiments presented herein, it is possible to extend coverage to portions of the Internet that are not visible to public sources, enabling the detection of low-visibility events. Since the BGP monitoring infrastructure of the embodiments proposed herein deploys its own BGP monitors instead of relying on public sources, the geolocation of monitors is known with 100% accuracy, which additionally improves the monitoring capabilities of the routing infrastructure.

Accordingly, present embodiments provide a BGP messaging service that collects and monitors BGP data in real-time and preserves all paths, not just the best paths. This is achieved by utilizing a combination of monitors and routers that forward BGP data through multiple hops using the BGP protocol (instead of converting the data to another format or utilizing other technologies) in combination with filtering techniques to select messages of interest. Thus, a large number of BGP sources can be efficiently monitored while providing real-time functionality and while also ensuring that the source of each BGP update is preserved throughout the collection process.

Thus, the embodiments presented herein provide an improved approach to processing BGP data in a more efficient and computationally quicker manner. The present embodiments provide several practical applications, including reducing latency despite scaling collection of BGP data to a large number of sources as compared to conventional techniques. Moreover, the present embodiments achieve these improvements without requiring routers to be deployed in co-location facilities, and without having to handle peering negotiations. Thus, present embodiments reduce costs, reduce latency, and provide a greater awareness of upstream BGP message providers by collecting more BGP data than conventional techniques while using lower processing requirements and without requiring specialized hardware equipment to be deployed.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. Reference is now made to FIG. 1. FIG. 1 depicts an environment 100 for BGP message monitoring, according to an example embodiment. As depicted, environment 100 includes a collection system 102, a monitoring platform 104, and full-feed providers (peers) 106. Collection system 102 includes a plurality of monitors 108A, 108B, 108C, 108D, 108E, 108F, . . . 108N, route collectors 110A and 110B, and a local route collector (RC) configurator 112. Monitoring platform 104 includes a BMP-enabled BGP router 114, a BGP Monitoring Protocol (BMP) collector 116, an event streaming service 118, an adapter 120, a processing and storage component 122, query results 124, filters 126, a router configurator 128, and an RC configurator 130. Additionally, a repository 132 may reside within collection system 102 and/or monitoring platform 104, or repository 132 may reside in a different location (e.g., a web-accessible repository). Generally, collection system 102 collects BGP messages and forwards the BGP messages to monitoring platform 104, which publishes BGP messages and processes various queries relating to the BGP messages. The components of environment 100 may each be implemented using cloud applications such as virtual machines or containers, or alternatively, some or all of the components may be implemented using hardware or a combination thereof. Collection system 102 may be implemented using one or more Virtual Private Server (VPS) providers that provide virtual machines and can support BGP sessions with full tables. Environment 100 may support any application network traffic, including both Internet Protocol version 4 (IPv4) and version 6 (IPv6) BGP updates.

Collection system 102 collects BGP data from peers 106. Each peer 106 may include an Autonomous System (AS), which is a network or set of networks that adhere to a same routing policy. Each AS can be identified by a unique Autonomous System Number (ASN). The BGP data can include information about network prefixes, paths, and/or attributes associated with those paths. In some embodiments, the BGP data includes route advertisements, which can include an IP address range that is being advertised, the sequence of ASNs that a route advertisement has traversed, the origin of each route indicating how each route is introduced, and/or other data. Additionally or alternatively, the BGP data can include route withdrawals, which indicate that a previously-advertised prefix is no longer reachable. Thus, the BGP data collected from peers 106 can provide details regarding the current state of Internet routing.

Monitors 108A-108N may include routers that obtain or receive BGP data from peers 106. Each monitor 108A-108N may be implemented using a virtual machine or a container and routing software (including open-source routing software or other routing software). Monitors 108A-108N may receive the BGP data via a BGP session, such as an external BGP (eBGP) session.

Monitors 108A-108N may form another BGP session with one or more route collectors (e.g., route collectors 110A and 110B) in order to provide the BGP data to the route collectors 110A and 110B. The BGP data can be labeled with respect to the source of each BGP update, which can include an IP address and/or an ASN of the source. In some embodiments, the BGP data in the BGP session that is between monitors 108A-108N and route collectors 110A and 110B is labeled with the source by inserting the source information in an ORIGINATOR_ID attribute of the BGP data. This labeling function is part of BGP Route Reflection, as appreciated by those with ordinary skill in the art. Thus, the BGP data as well as the source information for the BGP data is transmitted to route collectors 110A and/or 110B via a BGP session. In some embodiments, any of monitors 108A-108N and/or route collectors 110A and 110B may be implemented using a BIRD Internet Routing Daemon (BIRD) router. In some embodiments, the number of monitors 108A-108N can be dynamically increased or decreased based on the system requirements. For example, when the number of instances of monitors 108A-108N is increased in order to increase the AS-graph coverage, more BGP data is being received.

The function of route collectors 110A and 110B includes aggregating the BGP data received from the plurality of monitors 108A-108N, as transmitting the BGP data directly from monitors 108A-108N to multiple BMP-enabled BGP routers for further processing would require a full mesh, therefore requiring significantly more BGP sessions to be set up and maintained. In a full mesh, for example, the number of BGP sessions is equal to $n*(n-1)/2$, where n is the number of BGP-enabled devices. By instead aggregating the BGP data and transmitting it to a next destination (e.g., BGP router 114) via another BGP session, additional processing is avoided (as the data remains in the BGP format), minimizing latency. In some embodiments, route collectors 110A and/or 110B may be implemented using virtual machines. In some embodiments, the number of route collectors can be dynamically increased or decreased according to the amount of BGP data currently being processed. In some embodiments, route collector 110A and/or 110B may be BMP-enabled and can provide route data directly to BMP collector 116 rather than providing the route data via BMP-enabled BGP router 114.

Route collectors 110A and/or 110B may be configured to perform filtering operations on the BGP data. In particular, route collectors 110A and/or 110B may filter the BGP data by ASN, IP prefix, or other considerations. The filters can either be an approved list (i.e., permitting BGP data to pass to the next destination if it matches an ASN or IP prefix) or a denied list (i.e., preventing BGP data that matches an ASN or IP prefix from being transmitted to the next destination). In some embodiments, the filters may be customer-defined, and may be received from local RC configurator 112 (e.g., via a Bird Internet routing daemon (BIRD) filter or other protocol), which performs various configuration operations relating to route collectors 110A and/or 110B. The filters may be applied per BGP session.

Once the filtering operations are performed on the BGP data, route collectors 110A and 110B provide the filtered BGP data to BMP-enabled BGP router 114. The BGP data is provided via another BGP session to a BMP-enabled BGP router and the BGP data may again be labeled with respect to its source. In order for the source for this other BGP session to not appear as the route collectors 110A or 110B, route reflection is employed and the source information can be included in an ORIGINATOR_ID attribute of the BGP data. Moreover, using an ADD-PATH attribute, all routing paths may be included in the BGP data. By using the ADD-PATH attribute, all paths are propagated from any route collectors to BMP-enabled BGP router 114, rather than just the best paths.

BGP router 114 may include another router that is implemented via hardware and/or software such as GoBGP. In one embodiment, BGP router 114 is implemented using a virtual machine. BGP router 114 may serve as an entry point for BGP data into monitoring platform 104. In some embodiments, BGP router 114 may perform additional filtering operations similar to the filtering performed by route collectors 110A and/or 110B, or BGP router 114 may perform the filtering operations instead of route collectors 110A and/or 110B. BGP router 114 may process the BGP data to prepare the BGP data for transmission to BMP collector 116 via the BMP protocol.

BMP collector 116 may include a BMP collector that receives incoming BGP updates and publishes the BGP updates via an event streaming platform (e.g., event streaming service 118). BMP collector 116 may be a microservice that is implemented using an open-source application such as GoBMP. BMP collector 116 may receive the BGP data of multiple Routing Information Bases in (RIB-in) format in which the source information is included. BMP collector 116 may provide the BGP data to event streaming service 118, which can be implemented by any streaming platform (e.g., Kafka). Using adapter 120, the BGP updates are filtered, normalized, and published in a unified format to the rest of the BGP pipeline by event streaming service 118. The processing and storage component can store the BGP data so that customers can query the BGP data. Query results 124 can be queried by application programming interfaces (APIs) using a query language such as GraphQL, and query results 124 can be utilized for generating alerting, metrics, dashboards, and/or logs, and query results 124 can be used by auxiliary services.

Filters 126 may include filters provided by customers, and can include ASN and/or IP range filters. Filters 126 may be provided to adapter 120, router configurator 128, and/or RC configurator 130. Adapter 120 can utilize filters when processing the BGP data in conjunction with event streaming service 118 so that the data can be filtered for publication purposes. Router configurator 128 can utilize the filters when configuring BGP router 114; the filtering instructions may be provided via remote procedure calls (RPCs) such as the GRPC streaming protocol. Additionally, filters can be provided to repository 132 via an API such as the GitHub (GIT) API, and repository 132 can provide the filters to local RC configurator 112 via another API (e.g., GIT API). The configurators (e.g., router configurator 128 and/or RC configurator 130) can receive the filtering attributes from a database in which filters 126 are stored, which can be provided by customers using a user interface or via an API (e.g., a GraphQL API). The configurators can determine changed states in routes and in response, configure or reconfigure the routing filters of route collectors 110A and/or 110B by providing the filters to repository 132 for transmission to local RC configurator 112 and subsequently, to route collectors 110A and/or 110B. The local RC configurator 112 can employ a polling mechanism to securely pull the filtering data from repository 132.

Figure 2:
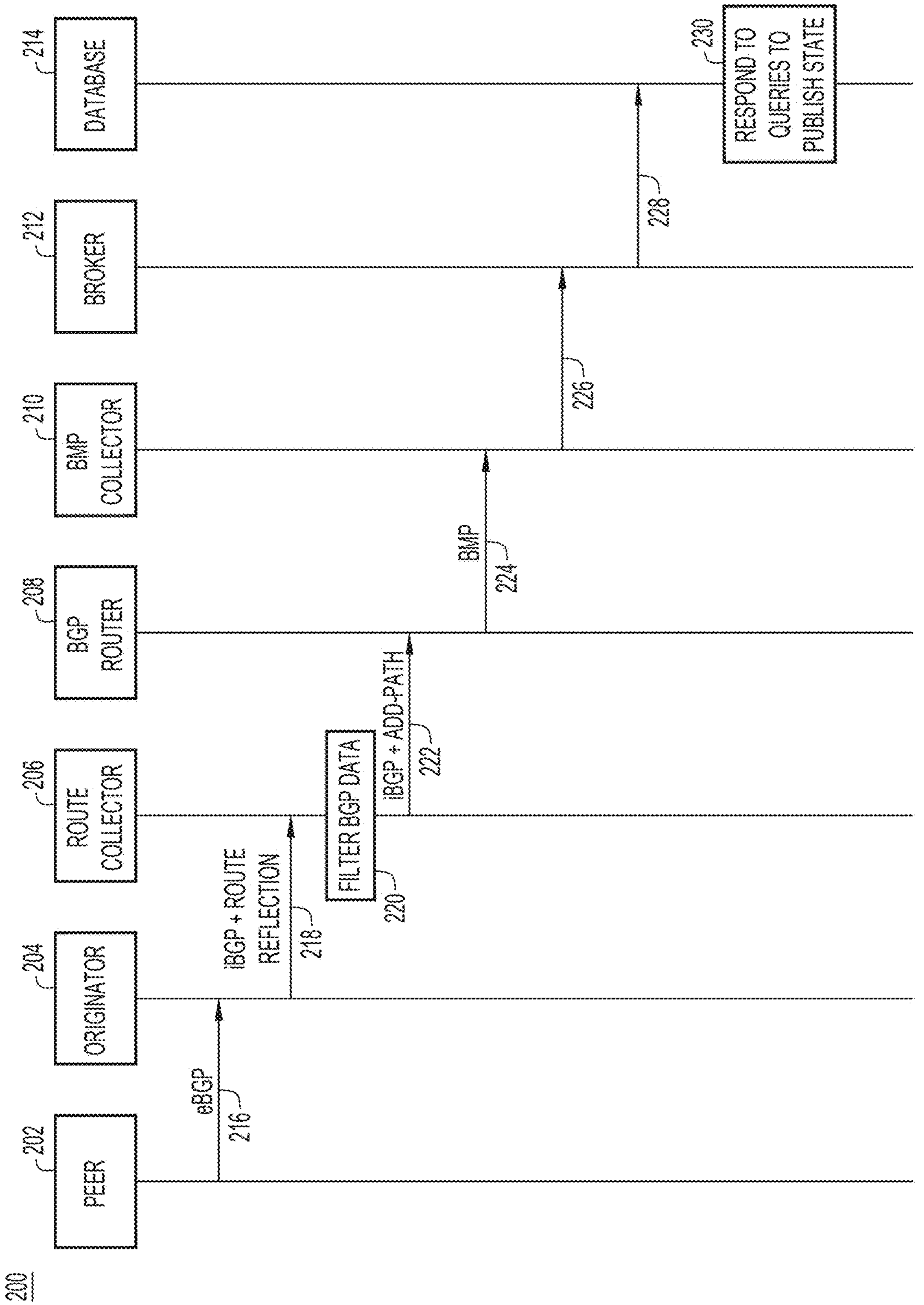
FIG. 2 is a signaling sequence diagram depicting a method for collecting BGP messages and providing routing information, according to an example embodiment.

FIG. 2 is a signaling flow diagram depicting a method 200 for collecting BGP messages and providing routing information, according to an example embodiment. As depicted, method 200 obtains, forwards, processes, and stores BGP data from peers 202 using an originator 204, a route collector 206, a BGP router 208, a BMP collector 210, a broker 212, and a database 214. It should be appreciated that each element can be implemented using hardware and/or software elements and one or more of each element may be present in a system. Originator 204, route collector 206, BGP router 208, BMP collector 210, broker 212, and database 214 may correspond to peers 106, any of monitors 108A-108N, either of route collectors 110A and 110B, BMP-enabled BGP router 114, BMP collector 116, event streaming service 118, and processing and storage component 122, respectively, as depicted and described with reference to FIG. 1.

Initially, peer 202 provides BGP data at operation 216 via an eBGP protocol, and the originator 204 receives the BGP data. The BGP data may include route advertisements, which can be expressed in Classless Inter-Domain Routing (CIDR) notation, (e.g., 192.0.2.0/24). Route advertisements also include the AS-PATH, which is the sequence of ASNs that the advertisement has passed through, useful in helping to determine the path to the destination network and to prevent loops. Additionally, the route advertisements can include the NEXT_HOP attribute, indicating the IP address of the next router for packet forwarding, and the ORIGIN attribute, which shows how the route was introduced into BGP (e.g., Interior Gateway Protocol (IGP), Exterior Gateway Protocol (EGP), or "incomplete"). Additionally or alternatively, route withdrawals may be included in the BGP data, which indicate that a previously-advertised prefix is no longer reachable. The BGP data may indicate a source of each announcement (an indication of an available route) or withdrawal (an indication that a route is no longer available). A particular source can be identified using an ASN and/or IP address.

At operation 218, originator 204 provides the BGP data to route collector 206 via a BGP session. The BGP session may utilize the Internal Border Gateway Protocol (iBGP) with route reflection, and the source information may be indicated in an ORIGINATOR_ID attribute. At operation 220, route collector 206 filters the BGP data using IP range filters and/or ASN filters. The filtering operations may be performed on a per-session basis for each BGP session.

At operation 222, route collector 206 provides the BGP data to BGP router 208 via another iBGP session. In this other BGP session, the source information may be conveyed using the ORIGINATOR_ID, with all collected paths conveyed using the ADD-PATH attribute. BGP router 208 may receive the BGP data and forward the data using the BMP protocol at operation 224 to BMP collector 210. BMP collector 210 may then publish the BGP data to broker 212 (operation 226), which may be implemented by an event streaming platform. Broker 212 can utilize one or more adapters to filter, normalize, and publish the BGP data in a manner that associates the source information with each announcement.

Broker 212 may publish the BGP data to database 214 (operation 228) so that the BGP data can be queried. At operation 230, the database 214 receives one or more queries and provides responses to the queries which are provided (for each requesting entity) to publish the state of each route that is queried. For example, a query may ask for information about the routing path(s) for a specific network prefix. The output of such a query generally includes multiple available paths to reach a destination, and can include attributes for each path such as the AS-PATH, (a sequence of ASes that the route traversed). Each path may include a NEXT_HOP address indicating the next router to which to forward packets, as well as various attributes like the origin type (e.g., IGP vs EGP) and other attributes. In some embodiments, the response may also indicate which path is considered the best based on the various attributes. However, the embodiments described herein support collection of all paths rather than a best path, so a response may indicate all available paths.

Figure 3:
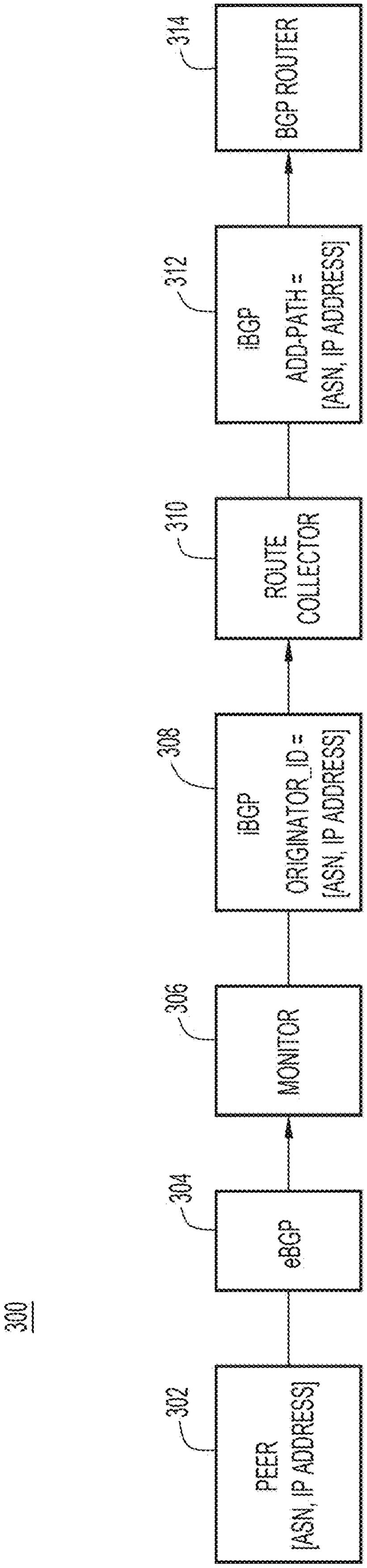
FIG. 3 is a block diagram depicting a method for collecting BGP data, according to an example embodiment.

FIG. 3 is a functional block diagram depicting a method 300 for processing BGP data, according to an example embodiment. Method 300 depicts an aspect of collecting BGP data that involves a peer 302, a monitor 306, a route collector 310, and a BGP router 314.

Peer 302 may include any external BGP peer, which is a router in another AS that exchanges routing information with other routers. As such, peer 302 has a specific ASN and IP address, which the monitor 306 may observe. Peer 302 may send BGP data (e.g., eBGP data 304) via an EGP session to monitor 306. When monitor 306 receives the eBGP data 304, monitor 306 can forward the data to route collector 310 via an iBGP session. Monitor 306 may send the BGP data as iBGP data 308, which includes inserting the ASN and IP address of peer 302 into the ORIGINATOR_ID attribute. When the route collector 310 receives the iBGP data 308, the route collector 310 can verify that the ASN and/or IP address satisfy any filtering criteria. Route collector 310 may then forward the data to BGP router 314 as iBGP data 312, which includes all collected paths, rather than the best paths, in the ADD-PATH attribute. BGP router 314 may receive the iBGP data 312, which can be processed through the rest of a BGP pipeline (as depicted and described with reference to FIGS. 1 and 2).

Figure 4:
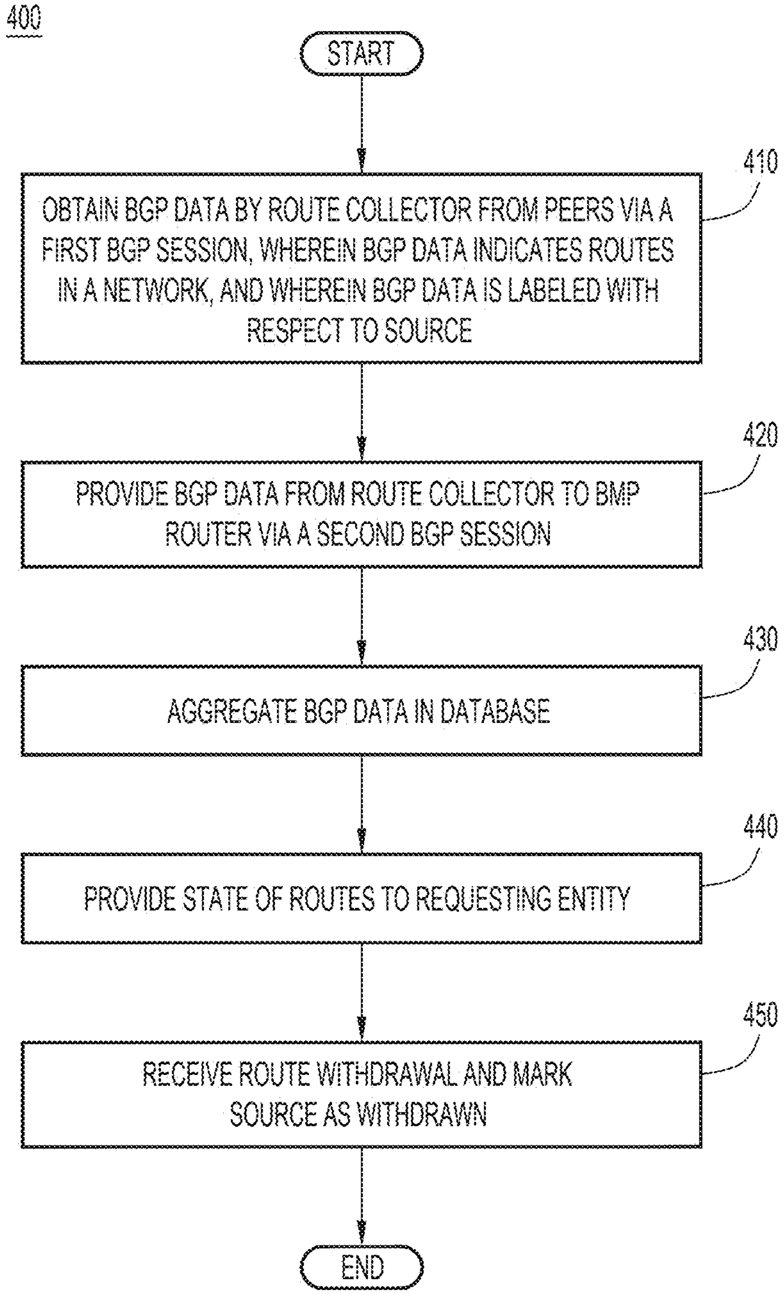
FIG. 4 is a flow chart depicting a method for collecting and publishing BGP data, according to an example embodiment.

FIG. 4 is a flow chart depicting a method 400 for collecting and publishing BGP data, according to an example embodiment.

At operation 410, a route collector obtains BGP data from a plurality of peers via a first BGP session. Initially, monitors obtain the BGP data, and they forward the BGP data to one or more route collectors for aggregation and optionally, filtering operations. The filtering operations may be performed when the data is stored in memory (e.g., Random Access Memory (RAM)). The BGP data can include route announcements and/or withdrawals with respect to routes in a network associated with application network traffic through one or more ASes. The BGP data may be labeled with respect to the source by the monitors so that each route collector can identify the true source of the BGP data, which can include an ASN and/or IP address. In some embodiments, the BGP data is labeled with the source information using an ORIGINATOR_ID attribute.

At operation 420, the route collector provides the BGP data to a BMP-enabled BGP router via a second BGP session. The BGP router can then forward the data to the BMP collector using the BMP protocol. The second BGP session may store the source information in an ORIGINATOR_ID attribute of the BGP data, so that the source can remain associated with each announcement.

At operation 430, the BGP data is aggregated in a database. The BMP router can provide the BGP data to an event streaming platform (e.g., Kafka), and the data may be normalized prior to storing in a database. The BGP data that is stored may include one or more routing paths, path identifiers for each path, source information (e.g., IP address and/or ASN), and/or IP prefix, as well as other information obtained from the various attributes of BGP data.

At operation 440, the state of one or more routes is provided to a requesting entity. A requesting entity can submit a query, which is processed using the database to identify one or more paths, and optionally, any other information stored in the database that is associated with the one or more paths. The response can include a best path (e.g., a path having a lowest latency) or multiple paths.

At operation 450, a route withdrawal is received and a source is marked as withdrawn. A route withdrawal does not contain the ORIGINATOR_ID attribute, therefore the source is instead indicated using a peer ID, which is contained in withdrawals. Thus, when routes are collected, each ORIGINATOR_ID may be matched to a corresponding peer ID (obtained from the ADD-PATH attribute), and these relationships can be stored in a data table. When a route withdrawal is received, the system may look up the ORIGINATOR_ID in the data table using the peer ID indicated in the route withdrawal. Thus, source information can be obtained and marked as withdrawn so that future queries will not show that path as advertised. In some embodiments, mappings of IP prefix, path identifier, and ASN/IP address can be stored in a data table that is either in memory or in a cache so that the mapping may quickly be accessed to associate withdrawn routes with their source.

Figure 5:
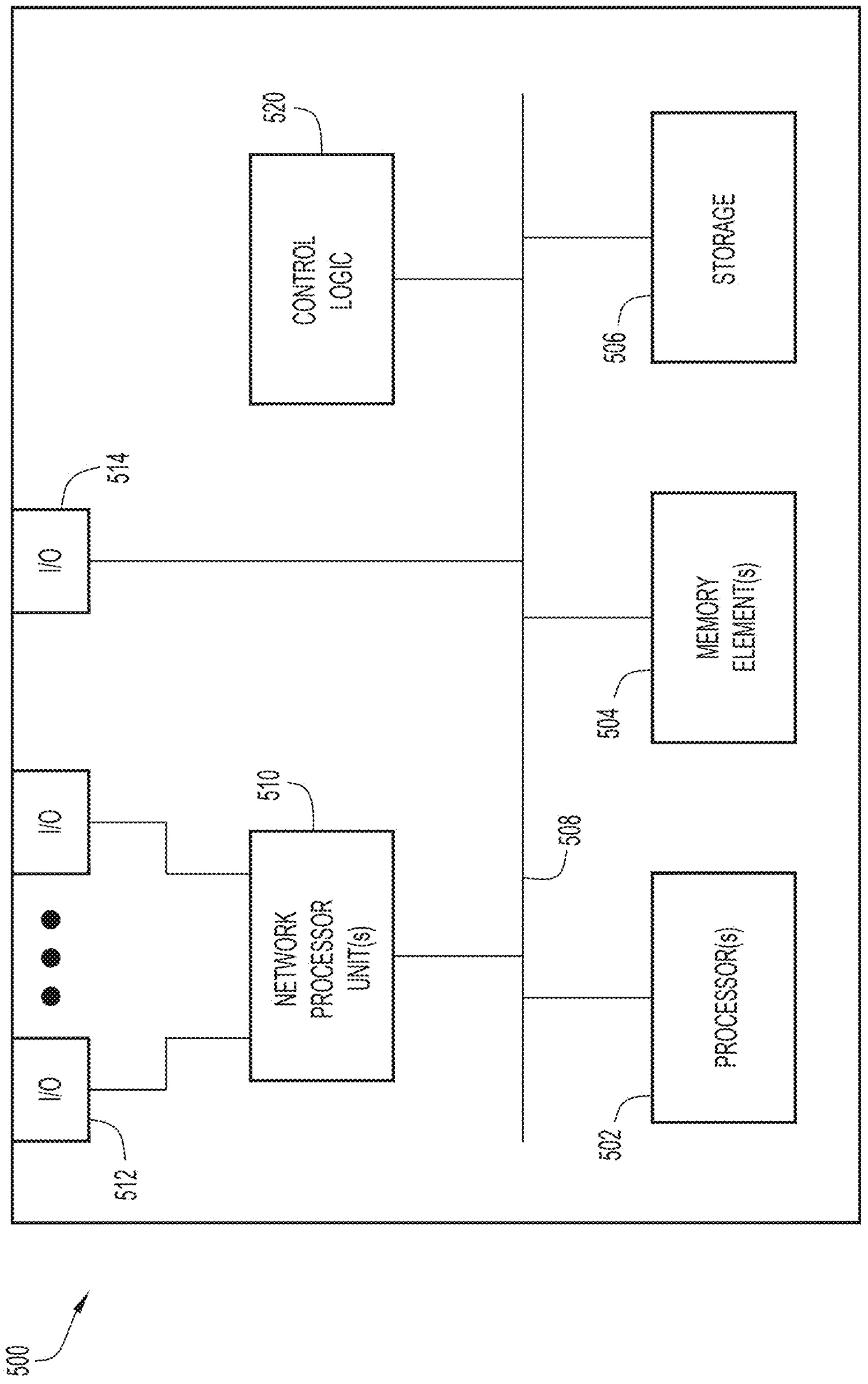
FIG. 5 is a block diagram depicting a computing device configured to perform the operations presented herein, according to an example embodiment.

Referring now to FIG. 5, FIG. 5 illustrates a hardware block diagram of a computing device 500 that may perform functions associated with operations discussed herein in connection with the techniques depicted in FIG. 1-4. In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element (s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O 514 allows for input and output of data and/or information with other entities that may be connected to computing device 500. For example, I/O 514 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element (s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In some aspects, the techniques described herein relate to a method including: obtaining, at a route collector, border gateway protocol (BGP) data from a plurality of peers by a plurality of routers, wherein the BGP data indicates a plurality of routes in a network associated with application network traffic, and wherein the route collector obtains the BGP data via a first BGP session and the BGP data is labeled with respect to a source of each route; and providing the BGP data from the route collector to a BGP Monitoring Protocol (BMP)-enabled BGP router via a second BGP session, wherein the BGP data is aggregated in a database that is configured to provide a state of one or more requested routes to a requesting entity.

In some aspects, the techniques described herein relate to a method, wherein the source of each route is included in an ORIGINATOR_ID attribute in the first BGP session or the second BGP session.

In some aspects, the techniques described herein relate to a method, wherein each route that is obtained by the route collector is included in an ADD-PATH attribute in the first BGP session or the second BGP session.

In some aspects, the techniques described herein relate to a method, further including filtering, by the route collector, the BGP data based on one or more of: an Internet Protocol address prefix, and an Autonomous System Number.

In some aspects, the techniques described herein relate to a method, wherein the filtering is based on the Internet Protocol address prefix or the Autonomous System number defined by the requesting entity.

In some aspects, the techniques described herein relate to a method, wherein the source is indicated by an Internet Protocol address and an Autonomous System Number.

In some aspects, the techniques described herein relate to a method, wherein the plurality of routers include virtual machine instances.

In some aspects, the techniques described herein relate to a method, wherein a combination of Internet Protocol address prefix, the source, and a path identifier are stored, and further including: determining that a route withdrawal has occurred; and marking the source as withdrawn based on the Internet Protocol address prefix and the path identifier.

In some aspects, the techniques described herein relate to a system including: a plurality of routers that are each configured to obtain BGP data from a plurality of peers, wherein the BGP data indicates a plurality of routes in a network associated with application network traffic; at least one route collector that is configured to obtain the BGP data from the plurality of routers via a first BGP session, wherein the BGP data is labeled with respect to a source of each route; a BMP-enabled BGP router configured to obtain the BGP data from the at least one route collector via a second BGP session; and a database configured to store the BGP data obtained by the BMP-enabled BGP router via a BMP collector and to provide a state of one or more requested routes to a requesting entity.

In some aspects, the techniques described herein relate to a system, wherein the source of each route is included in an ORIGINATOR_ID attribute in the first BGP session or the second BGP session.

In some aspects, the techniques described herein relate to a system, wherein each route that is obtained by the route collector is included in an ADD-PATH attribute in the first BGP session or the second BGP session.

In some aspects, the techniques described herein relate to a system, wherein the at least one route collector is configured to filter the BGP data based on one or more of: an Internet Protocol address prefix, and an Autonomous System Number.

In some aspects, the techniques described herein relate to a system, wherein the at least one route collector is configured to perform the filtering based on the Internet Protocol address prefix or the Autonomous System number defined by the requesting entity.

In some aspects, the techniques described herein relate to a system, wherein the source is indicated by an Internet Protocol address and an Autonomous System Number.

In some aspects, the techniques described herein relate to a system, wherein the plurality of routers include virtual machine instances.

In some aspects, the techniques described herein relate to a system, wherein a combination of Internet Protocol address prefix, the source, and a path identifier are stored, and further including: determining, by the system, that a route withdrawal has occurred; and marking the source as withdrawn based on the Internet Protocol address prefix and the path identifier.

In some aspects, the techniques described herein relate to one or more non-transitory computer readable storage media collectively having program instructions embodied therewith, the program instructions executable by a computer to cause the computer to: obtain, at a route collector, BGP data from a plurality of peers by a plurality of routers, wherein the BGP data indicates a plurality of routes in a network associated with application network traffic, and wherein the route collector obtains the BGP data via a first BGP session and the BGP data is labeled with respect to a source of each route; and provide the BGP data from the route collector to a BMP-enabled BGP router via a second BGP session, wherein the BGP data is aggregated in a database that is configured to provide a state of one or more requested routes to a requesting entity.

In some aspects, the techniques described herein relate to one or more non-transitory computer readable storage media, wherein the source of each route is included in an ORIGINATOR_ID attribute in the first BGP session or the second BGP session.

In some aspects, the techniques described herein relate to one or more non-transitory computer readable storage media, wherein each route that is collected by the route collector is included in an ADD-PATH attribute in the first BGP session or the second BGP session.

In some aspects, the techniques described herein relate to one or more non-transitory computer readable storage media, further including filtering, by the route collector, the BGP data based on one or more of: an Internet Protocol address prefix, and an Autonomous System Number.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

by a route collector, obtaining, from peer networks via a first border gateway protocol (BGP) session, BGP data that includes route advertisements of routes in the peer networks, ORIGINATOR_ID attributes to include source information identifying sources of the routes, and ADD-PATH attributes that include peer identifiers (IDs) for the peer networks;

generating mappings between the source information of the ORIGINATOR_ID attributes and corresponding ones of the peer IDs obtained from the ADD-PATH attributes;

by the route collector, providing the BGP data to a BGP Monitoring Protocol (BMP)-enabled BGP router via a second BGP session for access via a database configured to provide a state of one or more requested routes to a requesting entity; and upon receiving a route withdrawal that includes a peer ID to identify a source of a withdrawn route, accessing the mappings to associate the peer ID to the source information for the source of the withdrawn route.

2. The method of claim 1, further comprising filtering, by the route collector, the BGP data based on one or more of: an Internet Protocol address prefix, and an Autonomous System Number.

3. The method of claim 2, wherein the filtering is based on the Internet Protocol address prefix or the Autonomous System number defined by the requesting entity.

4. The method of claim 1, wherein the source information is indicated by an Internet Protocol address or an Autonomous System Number.

5. The method of claim 1, wherein obtaining includes obtaining the BGP data using a plurality of routers that comprise virtual machine instances.

6. The method of claim 1, further comprising: upon determining that the source is withdrawn, marking the source as withdrawn.

7. The method of claim 1, wherein the BGP data is aggregated in the database and includes routing paths, path identifiers for each routing path, the source information including an Internet Protocol (IP) address or an Autonomous System Number, and an IP prefix.

8. The method of claim 1, wherein the route withdrawal does not include the ORIGINATOR ID attributes.

9. A system comprising:

a route collector comprising a hardware processor configured to:

obtain, from peer networks via a first border gateway protocol (BGP) session, BGP data that includes route advertisements of routes in the peer networks, ORIGINATOR_ID attributes to include source information identifying sources of the routes, and ADD-PATH attributes that include peer identifiers (IDs) for the peer networks; and generate mappings between the source information of the ORIGINATOR_ID attributes and corresponding ones of the peer IDs obtained from the ADD-PATH attributes;

a BGP Monitoring Protocol (BMP)-enabled BGP router to obtain the BGP data from the route collector via a second BGP session; and a database to store the BGP data and provide a state of one or more requested routes to a requesting entity, wherein the route collector is configured to, upon receiving a route withdrawal that includes a peer ID to identify a source of a withdrawn route, access the mappings to associate the peer ID to the source information for the source of the withdrawn route.

10. The system of claim 9, wherein the route collector is configured to filter the BGP data based on one or more of: an Internet Protocol address prefix, and an Autonomous System Number.

11. The system of claim 10, wherein the route collector is configured to filter based on the Internet Protocol address prefix or the Autonomous System number defined by the requesting entity.

12. The system of claim 9, wherein the source information is indicated by an Internet Protocol address or an Autonomous System Number.

13. The system of claim 9, further comprising a plurality of routers comprising virtual machine instances used to obtain the BGP data via the first BGP session.

14. The system of claim 9, wherein the route collector is further configured to, upon determining that the source is withdrawn, mark the source as withdrawn.

15. The system of claim 9, wherein the BGP data is aggregated in the database and includes routing paths, path identifiers for each routing path, the source information including an Internet Protocol (IP) address or an Autonomous System Number, and an IP prefix.

16. The system of claim 9, wherein the route withdrawal does not include the ORIGINATORID attributes.

17. One or more non-transitory computer readable storage media collectively having program instructions embodied therewith, the program instructions executable by a computer to cause the computer to perform:

by a route collector, obtaining, from peer networks via a first border gateway protocol (BGP) session, BGP data that includes route advertisements of routes in the peer networks, ORIGINATOR_ID attributes to include source information identifying sources of the routes, and ADD-PATH attributes that include peer identifiers (IDs) for the peer networks;

generating mappings between the source information of the ORIGINATOR_ID attributes and corresponding ones of the peer IDs obtained from the ADD-PATH attributes;

by the route collector, providing the BGP data to a BGP Monitoring Protocol (BMP)-enabled BGP router via a second BGP session for access via a database configured to provide a state of one or more requested routes to a requesting entity; and upon receiving a route withdrawal that includes a peer ID to identify a source of a withdrawn route, accessing the mappings to associate the peer ID to the source information for the source of the withdrawn route.

18. The one or more non-transitory computer readable storage media of claim 17, further comprising program instructions to cause the computer to perform, by the route collector, filtering the BGP data based on one or more of: an Internet Protocol address prefix, and an Autonomous System Number.

19. The one or more non-transitory computer readable storage media of claim 17, wherein the BGP data is aggregated in the database and includes routing paths, path identifiers for each routing path, the source information including an Internet Protocol (IP) address or an Autonomous System Number, and an IP prefix.

20. The one or more non-transitory computer readable storage media of claim 17, wherein the route withdrawal does not include the ORIGINATOR ID attributes.

* * * * *